United States Patent
Ebert

(10) Patent No.: US 7,648,316 B2
(45) Date of Patent: Jan. 19, 2010

(54) FORSTNER DRILL BIT

(75) Inventor: Winfried Ebert, Weibern (DE)

(73) Assignee: Wolfcraft, GmbH, Kempenich (DE)

( * ) Notice: Subject to any disclaimer, the term of this patent is extended or adjusted under 35 U.S.C. 154(b) by 483 days.

(21) Appl. No.: 11/656,899

(22) Filed: Jan. 23, 2007

(65) Prior Publication Data
US 2007/0172325 A1 Jul. 26, 2007

(30) Foreign Application Priority Data
Jan. 26, 2006 (DE) .................. 10 2006 003 619

(51) Int. Cl.
*B23B 51/02* (2006.01)
*B27G 15/00* (2006.01)
(52) U.S. Cl. .................. 408/227; 408/205; 408/229
(58) Field of Classification Search .................. 408/199, 408/204, 205, 227, 229, 703; 407/56, 61; *B23B 51/02; B27G 15/00*
See application file for complete search history.

(56) References Cited

U.S. PATENT DOCUMENTS

| 598,142 | A | | 2/1898 | Ferguson |
| 1,140,988 | A | | 5/1915 | Kunitz |
| 1,185,380 | A | | 5/1916 | Davis |
| 1,415,317 | A | | 5/1922 | Crawford et al. |
| 1,499,584 | A | | 7/1924 | Litchfield |
| 2,593,823 | A | | 4/1952 | Wilson |
| 2,804,895 | A | * | 9/1957 | Clement .................. 408/72 R |
| 2,883,888 | A | | 4/1959 | Stewart |
| 3,180,379 | A | | 4/1965 | Stewart |
| 3,945,753 | A | | 3/1976 | Byers et al. |
| 4,090,807 | A | | 5/1978 | Stewart |
| 4,244,667 | A | * | 1/1981 | Timmons .................. 408/201 |
| 4,248,555 | A | | 2/1981 | Saton |
| 4,753,558 | A | | 6/1988 | Jansson |
| 5,193,951 | A | | 3/1993 | Schimke |
| 5,312,207 | A | | 5/1994 | Pomp |
| 5,695,304 | A | * | 12/1997 | Ebert .................. 408/227 |
| 5,975,814 | A | | 11/1999 | Pomp |
| 6,007,279 | A | * | 12/1999 | Malone, Jr. .................. 408/204 |
| 6,045,302 | A | | 4/2000 | Orr |
| 6,354,774 | B1 | | 3/2002 | Haughton et al. |
| 6,394,714 | B2 | | 5/2002 | Eberhard |

(Continued)

FOREIGN PATENT DOCUMENTS

AT 409600 9/2002

(Continued)

*Primary Examiner*—Eric A Gates
(74) *Attorney, Agent, or Firm*—K&L Gates LLP

(57) ABSTRACT

A drill bit has a cylindrical drill head (1) having two essentially diametrically situated primary cutting edges (2) and chip channels (3) associated therewith. The outer surface (5) of the drill head is formed by curved sections (6) whose end faces (4) have teeth (8) which extend in the axial direction (A) and have cutting edges (7) and cutting faces (9). The cutting faces (9) run at an acute angle in the cutting direction (S) and are set back with respect to a radial line (L) passing through the cutting edge (7). The teeth are formed by crenellated elements (8) which with one of their respective side walls form a cutting face (9) of the cutting edges (7). The side walls (10) of the adjoining crenellated element (8) opposite from the cutting face (9) runs parallel to the cutting face (9).

6 Claims, 4 Drawing Sheets

U.S. PATENT DOCUMENTS

| | | | |
|---|---|---|---|
| 6,612,788 B2 * | 9/2003 | Thomas et al. | 408/214 |
| 6,644,899 B2 | 11/2003 | Ebehard | |
| 6,874,978 B2 * | 4/2005 | Gongola | 408/144 |
| 2001/0031178 A1 | 10/2001 | Remke et al. | |
| 2004/0238154 A1 * | 12/2004 | Wirth et al. | 164/519 |
| 2007/0277656 A1 * | 12/2007 | Zeiler et al. | 83/13 |
| 2007/0280798 A1 * | 12/2007 | Zeiler et al. | 408/201 |

FOREIGN PATENT DOCUMENTS

| | | |
|---|---|---|
| CA | 2401134 | 9/2001 |
| DE | 3719758 A1 * | 1/1989 |
| DE | 196 26 485 | 2/1997 |
| DE | 299 11 945 | 10/1999 |
| DE | 29911945 U1 * | 10/1999 |
| DE | 200 03 898 | 7/2001 |
| DE | 202005008442 | 7/2005 |
| DE | 102007002530 | 8/2007 |
| EP | 0 855 257 | 7/1998 |
| EP | 1 263 557 | 2/2001 |
| EP | 1396319 A2 * | 3/2004 |
| FR | 2896442 | 7/2007 |
| WO | 01/64407 | 9/2001 |

* cited by examiner

FORSTNER DRILL BIT

CROSS REFERENCE TO RELATED APPLICATION

This application claims priority of German Patent Application No. 102006003619.0 filed Jan. 26, 2006, which is incorporated by reference.

BACKGROUND OF THE INVENTION

The invention relates to a drill bit comprising a cylindrical drill head having two essentially diametrically situated primary cutting edges and chip channels associated therewith, the outer surface of the drill head being formed by curved sections whose end faces have teeth which extend in the axial direction and have cutting edges and cutting faces, the cutting faces running at an acute angle in the cutting direction and being set back with respect to a radial line passing through the cutting edge.

A drill bit is known from U.S. Pat. No. 1,185,380. The known drill bit has a shaft and a drill head provided at the end of the shaft having an essentially cylindrical shape. The end face of this drill head has two primary cutting edges running essentially diagonally. Adjoining the outer ends of these cutting edges are curved sections provided with teeth. The cutting faces of the teeth are positioned at an acute angle relative to the radial direction.

A forstner drill bit is known from EP 0 855 257 B1 in which the peripheral surface of the cylindrical drill head has bulges formed by grooves extending at an angle with respect to the axial direction.

SUMMARY OF THE INVENTION

An advantage of the present invention can be to improve the manufacturing process for a drill bit.

In an embodiment, the present invention provides that the cutting edges run not at an angle but parallel to the axis of the drill bit. The teeth are formed by crenellated elements which with one of their side walls form the face of the cutting edge. The respective other side wall of the crenellated element forms a wall that is parallel to the cutting face of the adjoining crenellated element, so that the space between crenellated elements has two side walls running in parallel. One of these side walls runs at an acute angle in the cutting direction, set back with respect to a radial line passing through the cutting edge. A positive cutting angle is thus formed at the cutting edge running parallel to the drill bit axis. The invention further provides that the outer surfaces of the curved sections have smooth walls. The inner walls of the curved sections may be provided with grooves. These grooves preferably run in the axial direction and are associated with the space between crenellated elements. The curved sections adjoin the primary cutting edges at the rear and form recesses. These recesses may be provided by an end mill. For this purpose, first a steel blank is fabricated having a shaft and a cylindrical head. The cutting edges and chip channels may also be milled into the cylindrical head. The end mill used for milling the recess is also used to mill the grooves which extend in the axial direction and run near the base of the recess and parallel to the axis, extending outwardly in an inclined or curved manner near the base of the spaces between crenellated elements. The diameter of the end mill corresponds to the space between crenellated elements, so that these spaces between the crenellated elements may be easily milled using the end mill by adjusting the advance of the end mill in the radial direction. The advancing direction is at an acute angle with respect to the radial direction to allow the cutting faces to be produced. The end faces of the crenellated elements are formed by beveled surfaces. These beveled surfaces lie on an interior conical surface, so that the end faces of the crenellated elements form a guiding edge for the curved section. The spaces between crenellated elements serve as channels for the chips generated by the cutting edges during drilling.

Objects and advantages of the present invention may be desired, but are not necessarily required to practice the present invention. Additional features and advantages of the present invention are described in and will be apparent from the following Detailed Description of the Invention and the figures.

BRIEF DESCRIPTION OF THE FIGURES

One exemplary embodiment of the invention is explained below with reference to the accompanying figures, which show the following.

DETAILED DESCRIPTION OF THE INVENTION

Figure 1:
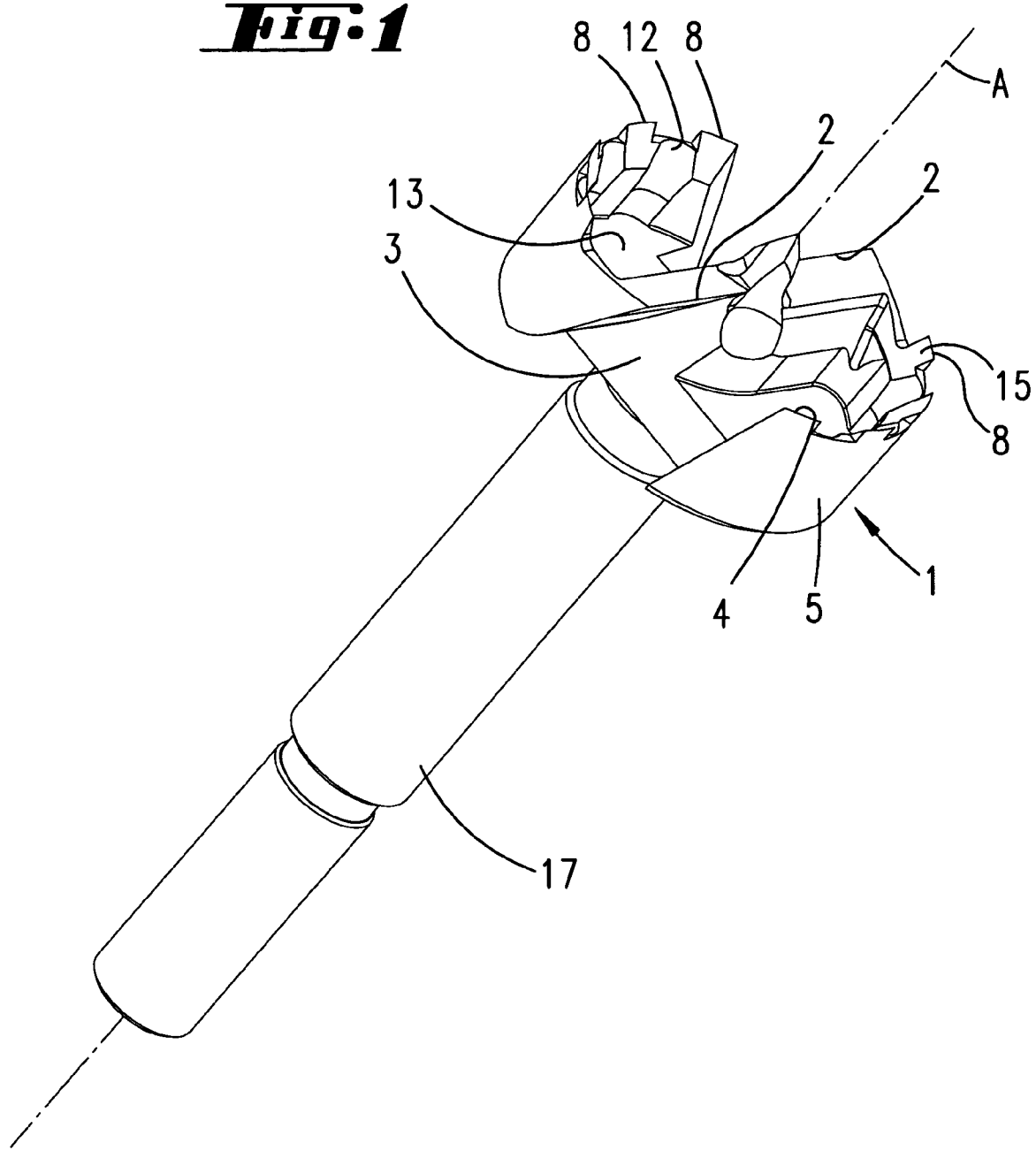
FIG. 1 shows the drill bit in a perspective illustration.

The drill bit is made of steel and has a cylindrical shaft 17 by which the drill bit may be clamped into the chuck of a drill. The drill head 1 of the drill bit has an essentially cylindrical design, with a cylindrical outer surface 5 interrupted by chip channels 3. The chip channels 3 are essentially diametrically opposed, and are associated with primary cutting edges 2. The two essentially diametrically situated primary cutting edges 2 run at right angles to axis A of the drill bit. In its center the drill head 1 has a centering tip 18.

The primary cutting edges 2 are adjoined at their radially outward ends by curved sections 6 which radially outwardly delimit a recess 13. The end face 4 of the curved sections 6 is formed by a beveled interior conical surface 15, and is interrupted by rectangular indentations. These rectangular indentations are located between teeth 8 having a crenellated shape. The end faces of the crenellated elements 8 thus produced form the above-referenced guiding edge 4, which is set back with respect to the primary cutting edges 2 in the axial direction.

Figure 2:
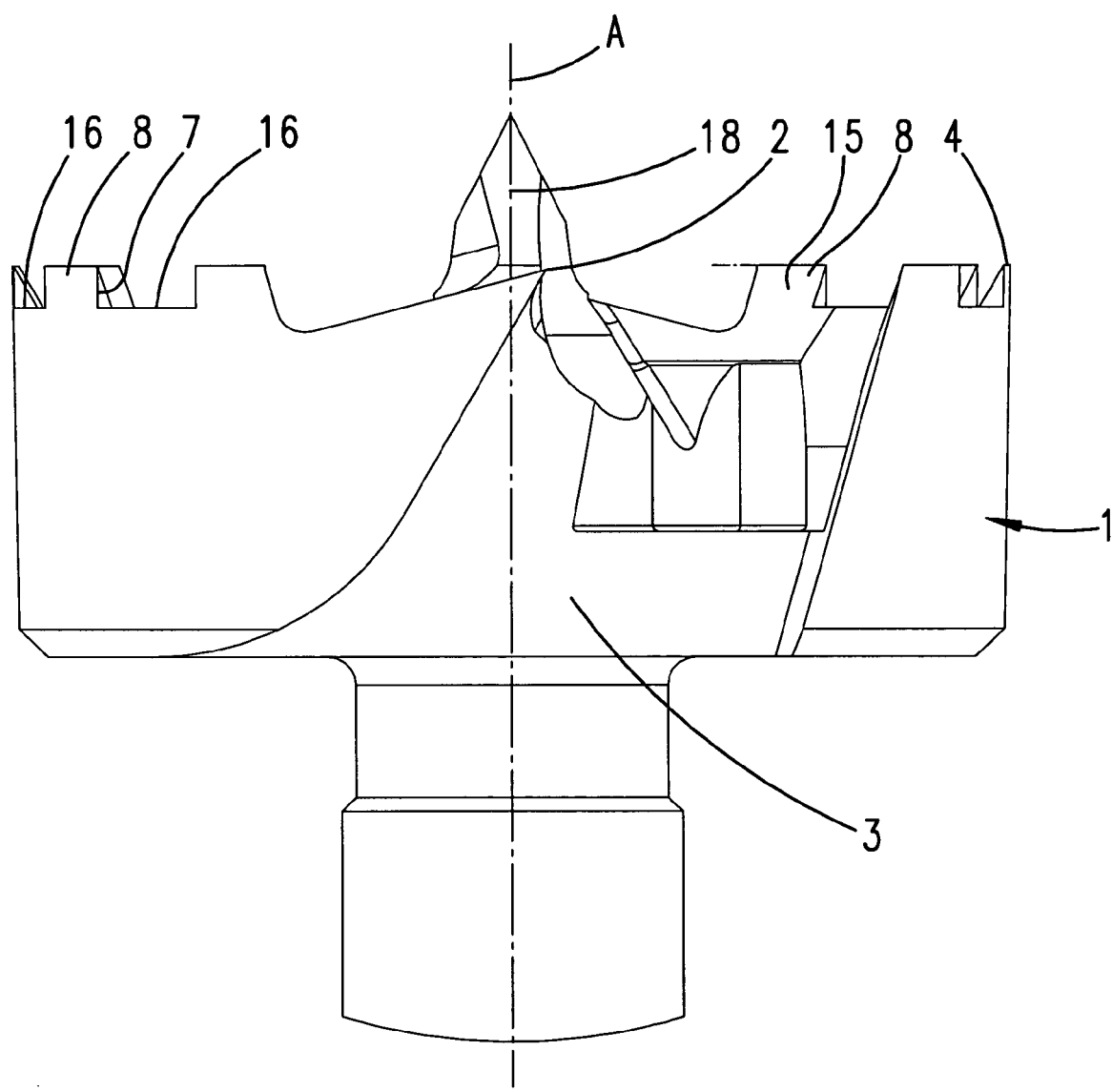
FIG. 2 shows the drill head in an enlarged view.

FIG. 2 shows that the bases 16 of the spaces between crenellated elements lie on an imaginary circumferential line.

Figure 3:
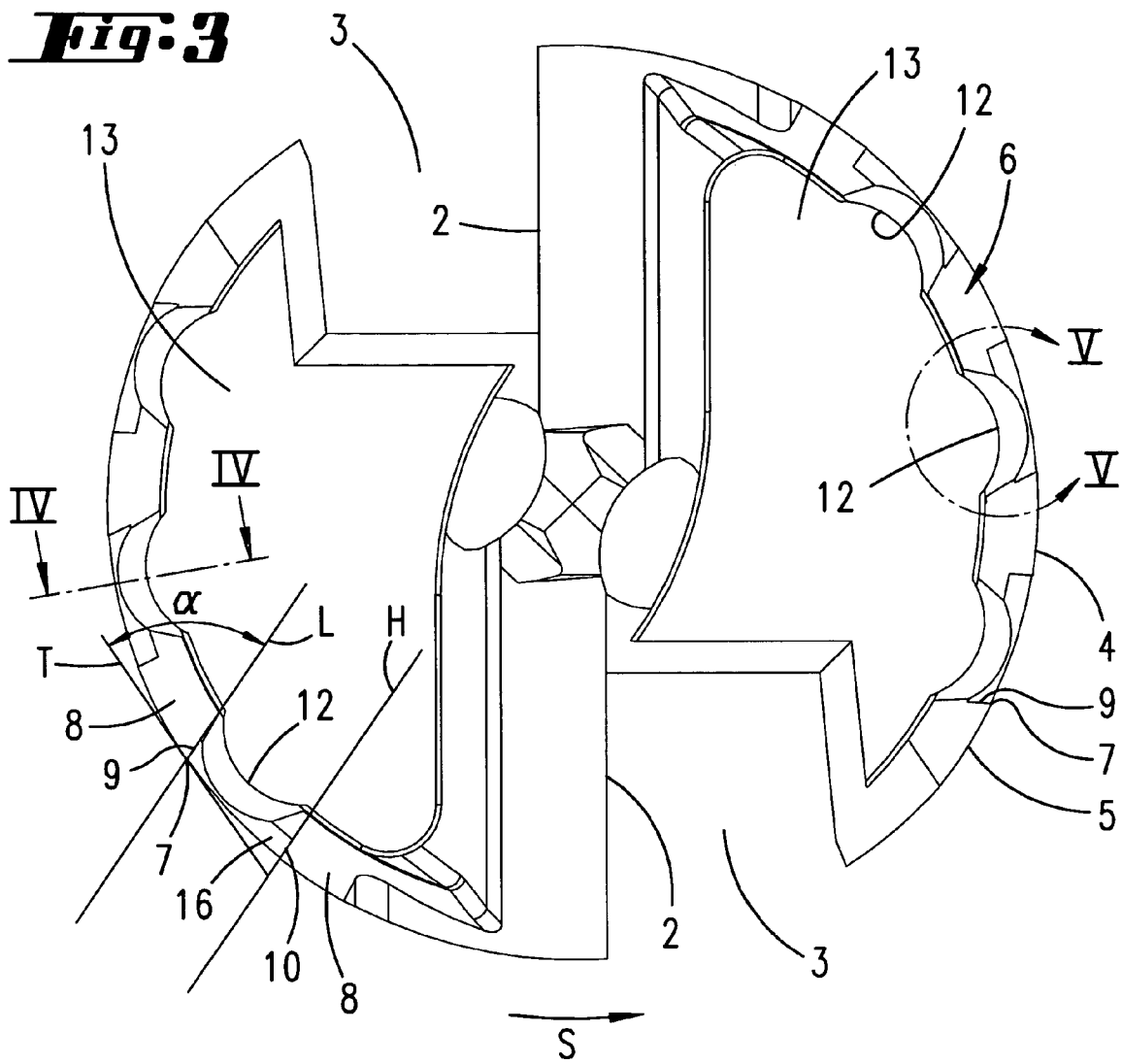
FIG. 3 shows a top view of the drill head.
Figure 4:
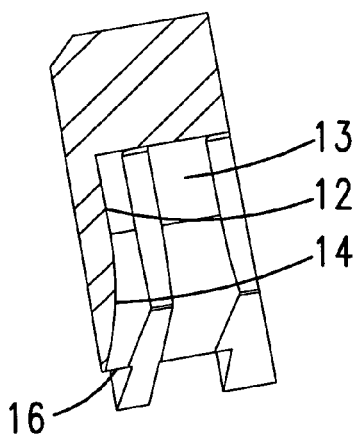
FIG. 4 shows a section according to line IV-IV in an enlarged illustration.
Figure 5:
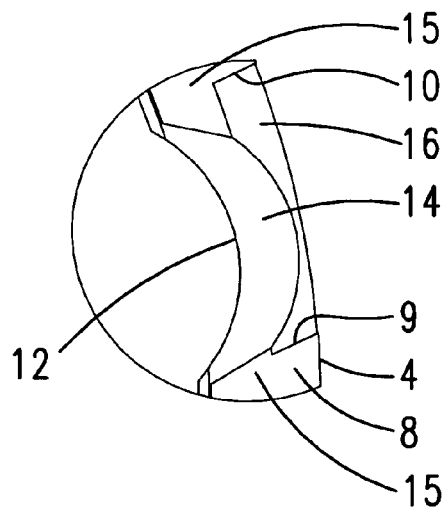
FIG. 5 shows detail V in FIG. 3.

FIG. 3 shows that the side walls 9 of the crenellated elements 8 run along a line L which defines an acute angle relative to the radial direction through the center of the drill head 1. Line L defines an angle a of approximately 65° with respect to the tangential line T. This angle preferably ranges from 50° to 80°, particularly preferably from 60° to 70°. The side wall 10, which is opposite the cutting face formed by the side wall 9 and is associated with an adjoining crenellated element 8, runs along a line H which likewise is inclined with respect to an imaginary radial line. Lines L and H run parallel to one another, and the spaces between crenellated elements thus form parallel side walls 9, 10, whereby the side wall 9 set back in the cutting direction S together with the outer surface 5 of the drill head 1 forms a cutting edge 7 which runs in the axial direction A.

FIG. 3 also shows that the inner walls of the curved sections 6 have grooves 12. These grooves 12 start at the base of the recesses 13 and run along same in the axial direction. At the end of the grooves the bases of the grooves 12 are curved radially outward in an upper groove section 14, and end in the bases 16 of the spaces between crenellated elements. These grooves 12 may also start at a distance from the base of the recess 13. The grooves may be preswaged.

The grooves 12, 14 may also be milled by the same end mill used to machine the recess 13. The rotational axis of the end mill is parallel to the axial direction A during this entire machining process. After the end mill has milled one of the grooves 12 the end mill is advanced diagonally upward and in the radially outward direction so that the end milling face of the end mill machines the upper groove section 14, which runs along a curved line. When the lower end face of the end mill reaches the level of the base 16 of the space between crenellated elements, the end mill continues to move forward in the radially outward direction so that the advancing direction of the end mill is inclined with respect to a radial line through axis A of the drill head 1. During this forward motion the space between crenellated elements is milled by the end mill. The two side walls 9 and 10 of the space between crenellated elements are therefore necessarily parallel to one another. The cutting edge 7 runs in the preferred axial direction A.

Figure 6:
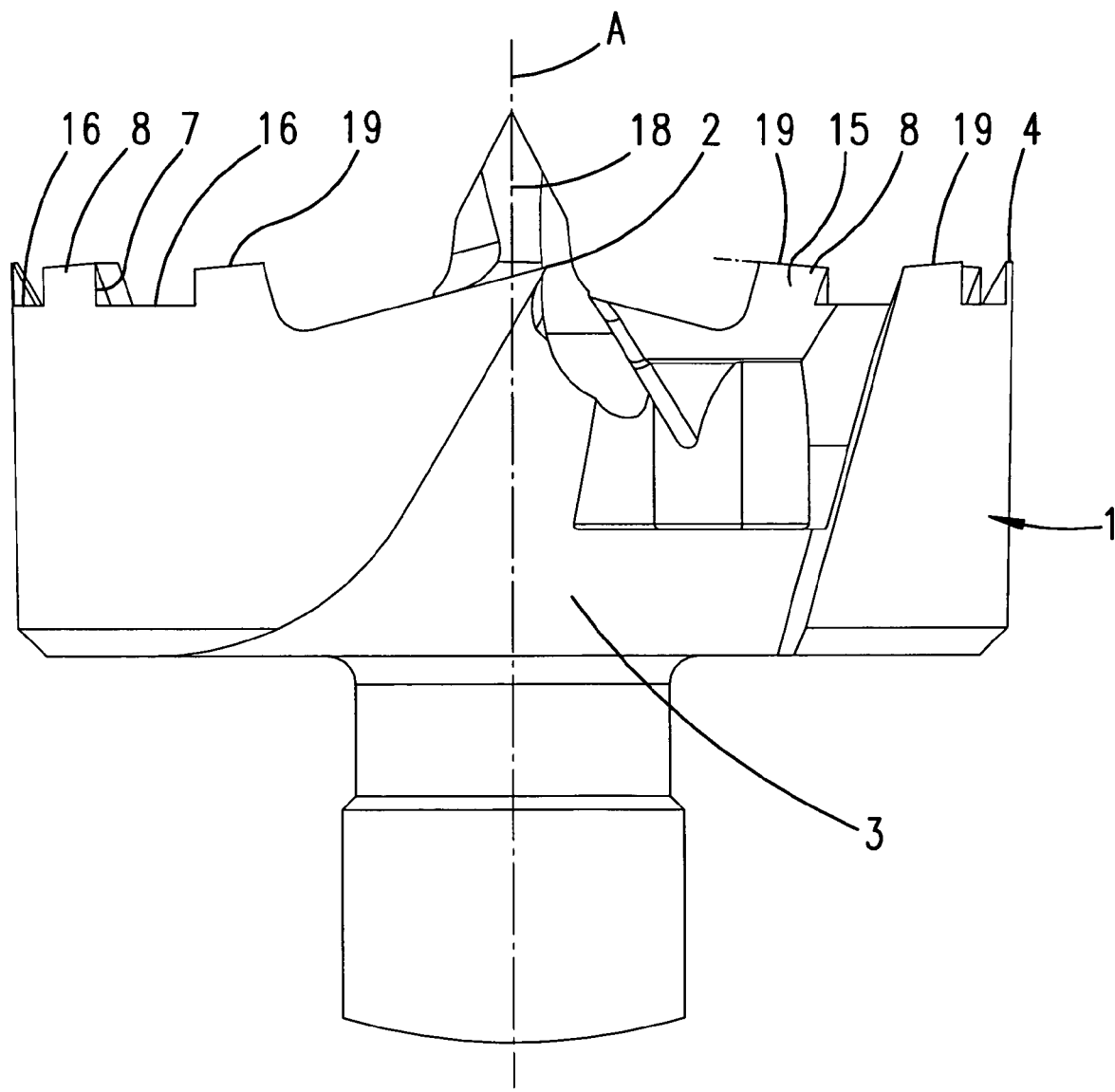
FIG. 6 shows an illustration according to FIG. 2 of a further exemplary embodiment of the invention.

In the exemplary embodiment illustrated in FIG. 6, the cutting edges 19 which lie essentially on a circular line about axis A are undercut. The angle between the cutting edges 19 and the cutting edges 7 is consequently less than 90°. In the exemplary embodiment the angle is 85°, so that the undercut is 5°. This undercut results in increased cutting power, and in particular reduces heating of the tool during drilling.

All disclosed features are (individually) pertinent to the invention. The disclosed content of the associated/accompanying priority documents (copy of the prior application) is hereby incorporated in full into the disclosure of the present patent application, also for the purpose of including features from these documents in claims for the present patent application.

It should be understood that various changes and modifications to the presently preferred embodiments described herein will be apparent to those skilled in the art. Such changes and modifications can be made without departing from the spirit and scope of the present invention. It is therefore intended that such changes and modifications be covered by the appended claims.

The invention claimed is:

1. A drill bit comprising a cylindrical drill head having two essentially diametrically situated primary cutting edges and chip channels associated therewith, an outer surface of the drill head being formed by curved sections having end faces having teeth which extend in an axial direction and have cutting edges with cutting faces, the cutting faces running at an acute angle in a cutting direction and being set back with respect to a radial line passing through the cutting edge, wherein the teeth are formed by crenellated elements which with one of their respective side walls form the cutting faces of the cutting edges, the side wall of the adjoining crenellated element opposite from the cutting face running parallel to the cutting face.

2. The drill bit according to claim 1, wherein the outer surfaces of the curved sections have smooth walls, and have grooves extending in the axial direction along inner walls of the curved sections and situated in a space between crenellated elements.

3. The drill bit according to claim 2, wherein each groove runs in the axial direction near a base of a recess defined by the curved section and extends in a radially outwardly inclined or curved manner near a base of the space between crenellated elements.

4. The drill bit according to claim 1, wherein the curved sections delimit recesses which adjoin the primary cutting edges at a rear portion.

5. The drill bit according to claim 4, wherein the recess is milled by an end mill which also mills the grooves and the spaces between crenellated elements.

6. The drill bit according to claim 1, wherein the face of the crenellated elements form a guiding edge which is formed by a conical beveled surface.

* * * * *